Dec. 21, 1965  F. J. GRIST  3,225,290
SUPPLY VOLTAGE COMPENSATION
Filed Nov. 3, 1960
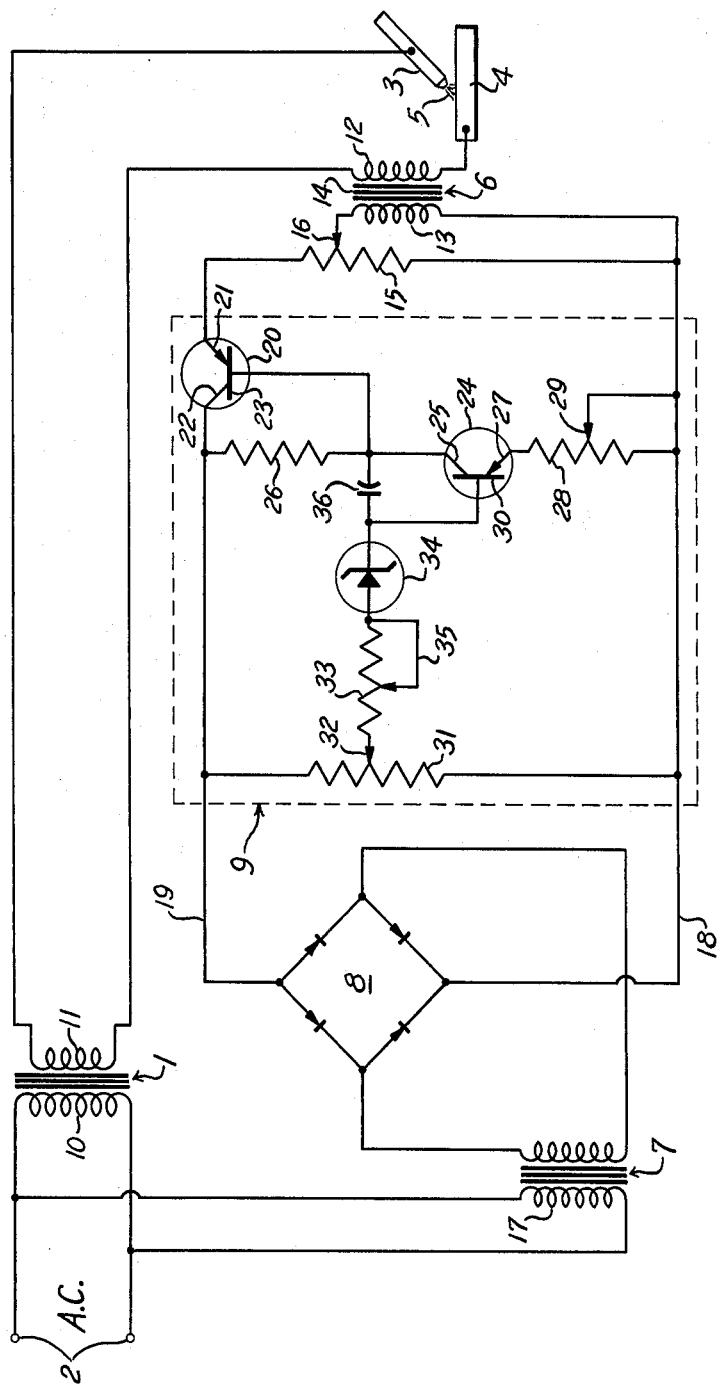
INVENTOR.
Franklin James Grist
BY
Andrus & Starke
Attorneys

United States Patent Office 3,225,290
Patented Dec. 21, 1965

3,225,290
SUPPLY VOLTAGE COMPENSATION
Franklin James Grist, Appleton, Wis., assignor to Miller Electric Mfg. Co., Appleton, Wis., a corporation of Wisconsin
Filed Nov. 3, 1960, Ser. No. 67,057
5 Claims. (Cl. 323—89)

This invention relates to an incoming voltage compensating circuit and particularly to an input responsive compensation circuit which compensates an output in accordance with sensed changes of the incoming voltage by any desired factor.

Various devices are designed for operation at a selected voltage and a variation from such voltage normally results in inefficient or abnormal operation. For example, certain arc welding apparatus is designed to employ a constant potential power source and to operate at a selected output current depending upon the particular welding operation. The power source is connected to the usual commercial power lines and the output current varies directly with variations in the incoming line voltage. Erratic arc action may result and the weld is not as perfectly formed as if the line voltage had remained constant.

The present invention is directed to a voltage compensation circuit adapted to sense variations in an incoming voltage and automatically adjust the output current by a selected factor. The present invention is particularly adapted for compensation where a saturable reactor current control or some similar line powered current control is employed.

The welding current or the like may be controlled by a saturable reactor unit having a load winding connected in the load circuit and a control winding connected to a D.C. converter having an input connected to the incoming power lines.

In circuits employing a line powered electrical control, an incoming line voltage variation is reflected directly in the load circuit and also through the control circuit. The present invention permits over-compensation such that a single compensation circuit adjusts the output to compensate for the dual reflection of a line voltage change.

As applied to the above described saturable reactor controlled welding circuit, the compensation circuit may be inserted between the D.C. converter and the saturating winding of the saturable reactor unit. The compensation circuit senses any change in the supply voltage and establishes an inverse compensation in the current. The compensation circuit is designed to over-compensate for changes in the line voltage as reflected in the D.C. control circuit by a predetermined factor and thereby automatically compensate for the direct change effected in the welding load circuit.

In accordance with the present invention, a series and a shunt control amplifying device are provided in the control circuit. The shunt amplifying device controls the bias of the series amplifying device and therefore the current in the series amplifying device and the control output circuit. A voltage sensing network is connected across the D.C. converter output to provide a D.C. signal proportional to the incoming line voltage and therefore proportional to a change in the incoming line voltage. A Zener diode or similar functioning device is connected to the voltage sensing network and to the shunt amplifying device to automatically vary the operating condition of the shunt device in accordance with line voltage variation. The shunt device correspondingly inversely operates the series amplifying device to establish the desired correction or compensation. The Zener diode establishes a reference point about which the compensation is provided.

In accordance with another aspect of this invention, a series resistance element is connected in the circuit with the Zener diode for adjustment of the current through the sensitivity control is provided by this method since the current change in the Zener diode circuit, for a given voltage change, is governed by the series resistance element.

In accordance with another aspect of the present invention particularly directed to use in combination with a full-wave rectifier converter, a comparatively small capacitor is connected across the input and the output of the shunt amplifying device to effectively eliminate the ripple component from the compensating circuit. This improves the compensating action in the circuit.

The present invention thus provides a compensation circuit for automatically compensating an output for a change in an incoming supply voltage by directly sensing an incoming voltage variation within a selected operating range. The present invention also permits choosing a compensating factor which substantially over-compensates for the sensed change.

The drawing furnished herewith illustrates the best mode presently contemplated for carrying out the invention.

The drawing is a schematic circuit diagram of an arc welding unit incorporating a supply line compensation circuit constructed in accordance with the present invention.

Referring to the drawing, the illustrated embodiment of the invention generally includes a welding transformer 1 having an input connected to a pair of incoming power lines 2 and an output connected across an electrode 3 and a workpiece 4. The welding transformer 1 is adapted to establish and maintain an arc 5 between the electrode 3 and the workpiece 4. A saturable reactor control 6 is inserted in the output circuit of the welding transformer 1 for adjustment of the welding current in arc 5. A voltage reducing control transformer 7 is connected to power lines 2 and, through a full-wave rectifier 8, is connected to supply a D.C. current to the saturable reactor control 6. In accordance with the illustrated embodiment of the present invention, a supply compensation circuit 9 is connected between the full-wave rectifier 8 and the saturable reactor control 6 to automatically compensate for changes in the incoming line voltage and maintain a selected welding current, as more fully described hereinafter.

The welding transformer 1 is any suitable variety adapted to reduce the incoming line voltage to a voltage suitable for striking and maintaining of arc 5. The illustrated transformer includes a primary winding 10 which is connected across the power incoming power supply lines 2 which are normally of a 230 volt potential. A secondary winding 11 is magnetically coupled to the primary winding 10 and is selected to establish the desired output voltage for maintaining of arc 5.

The saturable reactor control 6 is diagrammatically shown as including a load winding 12 which is connected in series with the secondary winding 11. The impedance of the load winding 12 determines the level of the welding current supplied to the arc 5. A D.C. saturating winding 13 is carried on a common core structure, shown diagrammatically at 14, with the load winding 12. A potentiometer 15 is connected to the rectifier 8 and to the D.C. saturating winding 13 to supply an adjustable current to the saturating winding 13. Potentiometer 15 includes an adjustable contact or tap 16 connected to one side of winding 13 for the adjustment of the D.C. current supplied to the control winding 13 and therefore the level of saturation of core structure 14. The reactance of load winding 12 varies inversely with the saturation and therefore adjustment of tap 16 varies the welding current in arc 5 for any given output voltage of transformer 1.

Control transformer 7 is of a suitable construction and is shown including a primary 17 connected across the power supply lines 2 in parallel with the primary winding 10 of transformer 1. Transformer 7 reduces the line voltage to a substantially lower voltage suitable for control purposes and thus reduces shock hazards and the cost and size of components.

The full-wave rectifier 8 is a conventional full-wave bridge-type rectifying unit connected across the output of the control transformer 7. Rectifier 8 establishes a positive potential control line 18 and a negative potential control line 19 which are connected respectively to the opposite ends of the potentiometer 15. For any given line voltage, a constant voltage drop appears across potentiometer 15. A portion of this voltage is applied to the saturable reactor control 6 in accordance with the setting of tap 16.

The welding arc circuit including transformer 1 is constructed to operate with the incoming supply lines 2 at a selected nominal or rated voltage. In fact, the voltage of the power supply lines 2 varies substantially in normal service. A line voltage variation is reflected correspondingly in the output of both the main welding transformer 1 and the control transformer 7. If the line voltage drops, the output of the main welding transformer 1 and of the control transformer 7 decreases. In the absence of a compensating means, the output of the main welding transformer 1 drops and reduces the welding current in arc 5 accordingly. The reduced control voltage results in a decrease in the D.C. current supply to the saturable reactor control 6 and a reduction in the saturation of core structure 14. The reactance of the load winding 12 increases and further reduces the welding current.

Similarly, an increase in the supply line voltage results in an upward variation in the power in the welding circuit.

The compensation circuit 9 in the drawing illustrates the preferred embodiment of the present invention and constitutes a simple and inexpensive compensating means for maintaining a selected output in the presence of voltage variation in the incoming power supply lines 2.

The illustrated compensation circuit 9 includes a series control transistor 20 which is inserted in series circuit relation in the negative potential control line 19 between the rectifier 8 and the potentiometer 15. The transistor 20 includes an emitter 21 connected to one side of the potentiometer 15 and a collector 22 connected to the output terminal of the rectifier 8. A base 23 of transistor 20 constitutes a control element determining the current between the collector 22 and the emitter 21. The bias on base 23 is automatically controlled or changed in accordance with incoming line voltage changes by the action of a biasing transistor 24 which is connected in a voltage dividing network or branch across control lines 18 and 19.

Biasing transistor 24 includes a collector 25 which is connected in series with a fixed resistor 26 to the negative potential control line 19 from the rectifier 8. The control transistor 24 further includes an emitter 27 which is connected in series with a variable resistor 28 to the positive potential control line 18 from rectifier 8. Variable resistor 28 includes movable tap 29 which is also connected to the positive potential control line 18 for adjusting the resistance inserted in the circuit.

The base 23 of the series control transistor 20 is connected to the junction or connection between the collector 25 of transistor 24 and the fixed resistor 26. The base is therefore held at the potential of that connection. The potential varies directly with the conducting condition of the biasing transistor 24 which acts as a variable resistant element.

The condition of the biasing transistor 24 is determined by a bias applied to a base element 30 in the biasing transistor 24. The bias applied to the base 30 automatically reflects changes in the line voltage as follows:

A potentiometer 31 is connected directly across the control lines 18 and 19 and includes a movable tap 32 which provides an adjustable D.C. voltage signal which is proportional to the incoming line voltage and which also reflects any change in the incoming line voltage. A coupling circuit including a variable resistor 33 in series with a Zener diode 34 connects the base 30 of control biasing transistor 24 to the tap 32 of the potentiometer 31.

The Zener diode 34 is selected having a voltage rating which is somewhat below the normal D.C. voltage available with the incoming line voltage at the rated voltage level. The tap 32 of potentiometer 31 is adjusted to establish a voltage in the avalanche or breakdown region of the Zener diode 34 which then draws current the value of which is established by the resistance inserted in series with the Zener diode by variable resistor 33.

A movable tap 35 is included as a part of variable resistor 33 and is connected to allow selectively shorting of the resistor 33 from the circuit. The current through the Zener diode 34 constitutes the base to emitter current of the transistor 24. The base to emitter current of transistor 24 therefore follows directly any increase or decrease of the input voltage appearing at lines 18 and 19 after the voltage at tap 32 exceeds the breakdown voltage of the Zener diode 34.

In accordance with conventional functioning of a transistor, the output current of the transistor 24 between the collector 25 and the emitter 27 follows the change in the base to emitter current. Therefore an increased line voltage increases the output of transistor 24 and conversely a decreased line voltage decreases the output current of the transistor 24. The biasing transistor 24 therefore appears as a variable resistance varying inversely with line voltage. The transistor 24 and the fixed resistor 26 therefore constitute a voltage dividing network connected across the D.C. lines 18 and 19. The potential of the junction between the fixed resistor 26 and the collector 25 of transistor 24 moves inversely with the variations in the line voltage. As the line voltage increases, the junction potential becomes more positive and a more positive potential is applied to the base 23 of the series control transistor 20. The increased positive potential at base 23 decreases the current in transistor 20 and thereby decreases the saturating current to control 6. The decreased saturation is reflected in a higher reactance in load winding 12 and a greater opposition to current flow. As subsequently described, the correction factor is selected to compensate for the line voltage change in both the main welding circuit and the current control circuit.

Similarly, a decrease in line voltage results in a more negative potential being applied to the base 23 of the main control transistor 20. The transistor 20 is accordingly biased to increase the current in the control circuit to control 6. The D.C. saturation of the saturable reactor control 6 is increased and causes a proper decrease in the reactance of the load winding 12 to compensate for the lower voltage in the main welding circuit and in the control circuit.

The compensation is selected to over-compensate in the control circuit and to therefore automatically compensate for the line voltage variation which is reflected in the output of the main welding transformer 1.

The potentiometer 28 is adjusted to compensate or correct for variations in amplification of the transistor 24 and to establish a minimum signal on the control element of transistor 20.

The output of the full-wave rectifier 8 inherently includes a ripple component in accordance with known operation of the rectifier. In accordance with an aspect of the present invention, a small feedback capacitor 36 is connected between the collector 25 and the base 30 of the transistor 24 to filter out the ripple component at the base of the transistor 24. The feedback capacitor 36 employs the current amplification of the transistor 24 and may be a relatively small and inexpensive capacitor to provide highly satisfactory reduction of the ripple effect.

The operation of the illustrated embodiment of the invention is summarized as follows:

The main welding transformer 1 and the control transformer 7 are connected to the incoming power supply lines 2. The potentiometer 15 is set to properly energize saturable reactor control 6 and establish a desired output current when the incoming power lines 2 are at rated voltage.

Tap 32 of potentiometer 31 is set to establish a voltage in the breakdown or avalanche region of the Zener diode 34 and the variable resistor 33 is set to provide the desired sensitivity of operation. The potentiometer 31 determines the mean operating voltage or level about which a selected degree of compensation for variations in the incoming power supply voltage is provided. The variable resistor 33 sets the circuit to provide the selected degree of compensation about the operating voltage or level.

The tap 29 of variable resistor 28 is set to provide the minimum cutoff in the voltage dividing network and to adjust the degree of compensation for a rising incoming power supply voltage only. Thus, assume the transistor 24 is biased to function as a short circuit, variable resistor 28 and the fixed resistor 26 act as a voltage dividing network with the inserted resistance of the variable resistor 28 establishing the minimum potential which can be applied to the base 23 of transistor 20.

The arc 5 is then struck between the electrode 3 and the workpiece 4.

If during a welding operation, the line voltage increases or decreases, the output of the main transformer 1 and the control transformer 7 changes accordingly.

The variation in the line voltage is reflected in the output of control transformer 7 and therefore at tap 32 of potentiometer 31. The current level in the Zener diode 34 changes accordingly although the voltage across the Zener diode remains constant. The base to emitter current of the biasing transistor 24 is changed and biasing transistor 24 changes the current through the voltage dividing branch including resistors 26 and 28. The potential of the junction between resistor 26 and collector 25 of transistor 24 and therefore at base 23 of transistor 20 becomes more positive when the line voltage increases and more negative when the line voltage decreases. An increasing line voltage therefore results in a decrease in current supplied to the D.C. saturating winding 13 of the saturable reactor control 6 and conversely a decreasing line voltage results in an increased current supplied to the D.C. saturating control winding 13. The welding circuit impedance is therefore continuously adjusted to maintain the desired output current regardless of variation in the voltage of the supply lines 2.

The variable resistor 33 in series with the Zener diode 34 provides a simple and ready means for controlling the dynamic characteristic of the Zener diode circuit and of the degree of compensation. A Zener diode 34 having an exceptionally large current change for a given voltage change can be employed to establish a very sensitive control. The Zener diode as applied is connected in the base circuit of the shunt biasing transistor 24 and therefore draws a very small base to emitter current. It may therefore be a low wattage Zener diode.

Insertion of resistor 33 in series circuit with diode 34 reduces the current change for any given voltage and thereby reduces the sensitivity of the control. The illustrated circuit is designed to provide substantial overcompensation and by suitable adjustment of the resistor 33, the degree of over-compensation is reduced to establish automatic compensation in accordance with the cumulative effect of the voltage change in the welding circuit and in the control circuit.

The capacitor 36 eliminates the ripple component in the D.C. current and therefore provides maximum change of bias upon the base 23 of the series control transistor 20 with changes in line voltage. The capacitor 36 increases the amount of over-compensation available to a maximum level.

The potentiometer 15 can be set to supply any desired current between zero and maximum current to the saturating winding 13 and the compensating circuit 9 functions to add or subtract percentage current in accordance with variations in the voltage of the supply line. The amount of percentage compensation is independent of the load current in the welding circuit or of the control current in the control circuit.

If extreme low line voltages occur, the voltage supplied to the Zener diode 34 becomes less than the breakdown voltage and effectively disconnects the compensation circuit 9. The welding current output decreases and the possibility of damaging high currents is prevented.

The amount of resistance inserted in the control circuit is held to a minimum by eliminating fixed resistors in the main control circuit except for the potentiometer 15. At normal line voltages, the resistance of the series control transistor 20 is very low since it is operated in its saturated region.

The present invention provides practically instantaneous compensation and the response time of the control is dependent primarily upon the characteristic of the reactor or other control device.

The present invention thus provides a line voltage compensating means which senses line voltage changes directly and provides opposite over- or under-compensation of any desired percentage independently of the output circuit.

Various modes of carrying out the invention are contemplated as being within the scope of the following claims particularly pointing out and distinctly claiming the subject matter which is regarded as the invention.

I claim:

1. An incoming voltage compensation circuit connected to a power supply having an output connection for supplying current to a load, which comprises a control amplifying device series connected in the output circuit of the power supply and connected in series with the output connection for said load to establish a series connection to the load and for establishing a proportional current control to the load, a first voltage dividing network including a fixed circuit element and a biasing amplifying device connected in series across the power supply, said control amplifying device including a control element connected to the junction of the fixed circuit element and the biasing amplifying device, means to establish a minimum percentage voltage at the junction to continuously bias said control amplifying device to conduct, a second voltage dividing network connected across the power supply, said biasing amplifying device including a control element, and a coupling circuit including a variable voltage dropping element and a voltage regulating device in series connected between the control element of the biasing amplifying device and the second voltage dividing network to variably bias the biasing amplifying device and establish an operating level about which a selected degree of compensation for variations in the incoming power supply voltage is provided.

2. An incoming voltage compensation circuit for output compensation inserted in the D.C. output of a full-wave rectifier connected to incoming A.C. power supply lines, which comprises a control amplifying device series connected in the output circuit of the power supply, a first voltage dividing network including a fixed circuit element and a biasing amplifying device connected in series across the power supply, said series control amplifying device including a control element connected to the junction of the fixed circuit element and the biasing amplifying device, a second voltage dividing network connected across the power supply, said biasing amplifying device including a control element, a coupling circuit including a variable voltage dropping element and a voltage regulating device in series connected between the control element of the biasing amplifying device and the second voltage dividing network to variably bias the biasing amplifying device and establish an operating level about which a selected degree of compensation for variations in the incoming power supply voltage is provided, and a capacitor connected between the control element of the biasing amplifying device and said junction to essentially nullify the ripple component in the output of the full-wave rectifier.

3. An incoming voltage compensation circuit connected to the output of a full-wave rectifier energized from an A.C. power supply line and connected to energize an electrical control in a second circuit energized from the same A.C. power lines, which comprises series connected amplifying means connected between the output of the rectifier and the input to the electrical control, a shunt connected amplifying means and a voltage dropping element connected across the rectifier to the input side of the series connected amplifying means, a voltage dividing network connected across the rectifier, a voltage regulating device and an adjustable resistance connected in series between the voltage dividing network and the shunt connected amplifying means, and the voltage regulating device establishing a maximum over-compensation greater than required to maintain a desired output in the second circuit with voltage changes in the incoming A.C. power lines and the adjustable resistance reducing the over-compensation to a selected level to establish a desired output in the second circuit.

4. In an arc welding supply having a welding circuit connected to A.C. power lines and having an electrically operated D.C. current control in the welding circuit, a control transformer connected across the A.C. power lines to lower the control voltage, a full-wave rectifier connected to the control transformer to establish a D.C. current for the D.C. current control, a solid state amplifying means connected in series between the rectifier and the current control and having a biasing element, a second solid state amplifying means connected across the output of the rectifier and having a biasing element, a resistance means connected in series with the second solid state amplifying means to form a voltage dividing network, the biasing element of the first solid state amplifying means being connected between the resistance means and the second solid state amplifying means, a voltage dividing means connected across the rectifier, a Zener diode connected to the voltage dividing means and to the control element of the second solid state amplifying means, and a variable resistance means connected in series circuit with the Zener diode for adjusting of the amount of compensation by limiting the current through the Zener diode.

5. In an arc welding supply having a welding circuit connected to A.C. power lines and having a saturable reactor current control including a D.C. saturating winding, a control transformer connected across the A.C. power lines to lower the control voltage, a full-wave rectifier connected to the control transformer to establish a D.C. power source for the saturating winding, a solid state amplifying means connected in series between the rectifier and the saturating winding and having a control element, a second solid state amplifying means connected across the output of the rectifier and having a control element, a resistance means connected in series with the second solid state amplifying means to form a voltage dividing network, the control element of the first solid state amplifying means being connected between the resistance means and the second solid state amplifying means, a variable resistance means connected in series with the second amplifying means opposite said resistance means to establish a minimum signal on the control element of the first amplifying means, a potentiometer having a movable output tap and connected across the rectifier, a Zener diode connected to the output tap of the potentiometer and to the control element of the second solid state amplifying means, a variable resistance means connected in series circuit with the Zener diode for adjusting the amount of compensation, and a capacitor connected between the control element of the second amplifying means and the connection of the resistance means and the second amplifying means, said second-named variable resistance means being adjusted to provide over-compensation in the welding circuit for line voltage reflected changes in the welding circuit and the control circuit.

References Cited by the Examiner

UNITED STATES PATENTS

| | | | |
|---|---|---|---|
| 2,471,822 | 5/1949 | Lang | 323—89 X |
| 2,751,549 | 6/1956 | Chase | 321—18 |
| 2,945,174 | 7/1960 | Hetzler | 323—22 |
| 2,971,102 | 2/1961 | Schultz | 323—22 |
| 2,980,843 | 4/1961 | Conger et al. | 322—28 |
| 2,988,688 | 6/1961 | Benton | 323—4 |

LLOYD McCOLLUM, *Primary Examiner.*

SAMUEL BERNSTEIN, *Examiner.*